US006721918B2

(12) United States Patent
Self et al.

(10) Patent No.: US 6,721,918 B2
(45) Date of Patent: Apr. 13, 2004

(54) METHOD AND APPARATUS FOR ENCODING A BUS TO MINIMIZE SIMULTANEOUS SWITCHING OUTPUTS EFFECT

(75) Inventors: Keith Self, Aloha, OR (US); John Urbanski, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 498 days.

(21) Appl. No.: 09/750,297

(22) Filed: Dec. 29, 2000

(65) Prior Publication Data

US 2002/0087936 A1 Jul. 4, 2002

(51) Int. Cl.[7] ............................................. H03M 13/00
(52) U.S. Cl. ...................... 714/800; 710/65; 710/107; 711/172
(58) Field of Search .................. 714/800; 710/65, 710/107; 375/133; 711/172

(56) References Cited

U.S. PATENT DOCUMENTS

| | | | | |
|---|---|---|---|---|
| 4,281,392 A | * | 7/1981 | Grants et al. ................ 711/172 |
| 5,452,319 A | * | 9/1995 | Cook et al. .................. 375/133 |
| 5,485,579 A | | 1/1996 | Hitz et al. ............. 395/200.12 |
| 5,495,419 A | | 2/1996 | Rostoker et al. ............ 364/468 |
| 5,535,116 A | | 7/1996 | Gupta et al. ................. 364/134 |
| 5,541,914 A | | 7/1996 | Krishnamoorthy et al. ... 370/56 |
| 5,551,048 A | | 8/1996 | Steely, Jr. ................... 395/800 |
| 5,557,533 A | | 9/1996 | Koford et al. ............... 364/491 |
| 5,581,729 A | | 12/1996 | Nishtala et al. ............. 395/470 |
| 5,588,131 A | | 12/1996 | Borrill ........................ 395/473 |
| 5,588,132 A | | 12/1996 | Cardoza ...................... 395/475 |
| 5,588,152 A | | 12/1996 | Dapp et al. .................. 395/800 |
| 5,590,292 A | | 12/1996 | Wooten et al. .............. 395/825 |
| 5,590,345 A | | 12/1996 | Barker et al. ............... 395/800 |
| 5,594,918 A | | 1/1997 | Knowles et al. ............ 395/800 |
| 5,603,005 A | | 2/1997 | Bauman et al. ............. 395/451 |
| 5,613,136 A | | 3/1997 | Casavant et al. ........... 395/800 |
| 5,617,537 A | | 4/1997 | Yamada et al. ........ 395/200.01 |
| 5,625,836 A | | 4/1997 | Barker et al. ............... 395/800 |
| 5,634,004 A | | 5/1997 | Gopinath et al. ...... 395/200.02 |
| 5,634,068 A | | 5/1997 | Nishtala et al. ............. 395/800 |
| 5,636,125 A | | 6/1997 | Rostoker et al. ........ 364/468.28 |
| 5,644,753 A | | 7/1997 | Ebrahim et al. ............ 395/458 |
| 5,655,100 A | | 8/1997 | Ebrahim et al. ............ 395/471 |
| 5,657,472 A | | 8/1997 | Van Loo et al. ............ 395/485 |
| 5,678,026 A | | 10/1997 | Vartti et al. ................. 395/479 |
| 5,680,571 A | | 10/1997 | Bauman ...................... 395/449 |
| 5,680,576 A | | 10/1997 | Laudon ....................... 395/472 |
| 5,682,322 A | | 10/1997 | Boyle et al. ................ 364/491 |
| 5,682,512 A | | 10/1997 | Tetrick ........................ 395/412 |
| 5,684,977 A | | 11/1997 | Van Loo et al. ............ 395/470 |
| 5,699,500 A | | 12/1997 | Dasgupta .................... 395/180 |
| 5,701,313 A | | 12/1997 | Purdham ..................... 371/40.2 |
| 5,701,413 A | | 12/1997 | Zulian et al. ........... 395/200.02 |
| 5,708,836 A | | 1/1998 | Wilkinson et al. ......... 395/800 |
| 5,710,935 A | | 1/1998 | Barker et al. ............... 395/800 |
| 5,713,037 A | | 1/1998 | Wilkinson et al. ......... 395/800 |
| 5,717,942 A | | 2/1998 | Haupt et al. ................ 395/800 |
| 5,717,943 A | | 2/1998 | Barker et al. ............... 395/800 |
| 5,717,944 A | | 2/1998 | Wilkinson et al. ......... 395/800 |
| 5,734,921 A | | 3/1998 | Dapp et al. ................ 395/800.1 |
| 5,734,922 A | | 3/1998 | Hagersten et al. ...... 395/800.37 |
| 5,742,510 A | | 4/1998 | Rostoker et al. ........ 364/468.03 |
| 5,745,363 A | | 4/1998 | Rostoker et al. ........ 364/468.28 |
| 5,749,095 A | | 5/1998 | Hagersten ................... 711/141 |
| 5,752,067 A | | 5/1998 | Wilkinson et al. ..... 395/800.16 |

(List continued on next page.)

Primary Examiner—David Ton
Assistant Examiner—Dipakkumar Gandhi
(74) Attorney, Agent, or Firm—Kenyon & Kenyon (57) ABSTRACT

A bus has a first set of data lines and a second set of data lines. In an embodiment, the bus has a selector circuit to count the number of data lines in the first set of data lines and second set of data lines that have a certain value and to select one set of data lines to be inverted based on the count. In an embodiment, the bus has a first inverter to invert the set of data lines selected and a second inverter to re-invert the set of data lines selected at a receiver based on the value of an added control line.

25 Claims, 4 Drawing Sheets

U.S. PATENT DOCUMENTS

| | | | |
|---|---|---|---|
| 5,754,789 A | 5/1998 | Nowatzyk et al. | 395/200.63 |
| 5,754,871 A | 5/1998 | Wilkinson et al. | 395/800 |
| 5,754,877 A | 5/1998 | Hagersten et al. | 395/800.29 |
| 5,761,523 A | 6/1998 | Wilkinson et al. | 395/800.2 |
| 5,765,011 A | 6/1998 | Wilkinson et al. | 364/800.2 |
| 5,781,439 A | 7/1998 | Rostoker et al. | 364/468.28 |
| 5,784,697 A | 7/1998 | Funk et al. | 711/170 |
| 5,787,094 A | 7/1998 | Cecchi et al. | 371/53 |
| 5,793,644 A | 8/1998 | Koford et al. | 364/491 |
| 5,794,059 A | 8/1998 | Barker et al. | 395/800.1 |
| 5,796,605 A | 8/1998 | Hagersten | 365/134 |
| 5,802,578 A | 9/1998 | Lovett | 711/147 |
| 5,805,839 A | 9/1998 | Singhal | 395/292 |
| 5,815,403 A | 9/1998 | Jones et al. | 364/489 |
| 5,842,031 A | 11/1998 | Barker et al. | 395/800 |
| 5,848,254 A | 12/1998 | Hagersten | 395/383 |
| 5,857,113 A | 1/1999 | Muegge et al. | 395/830 |
| 5,860,159 A | 1/1999 | Hagersten | 711/151 |
| 5,862,316 A | 1/1999 | Hagersten et al. | 395/182.13 |
| 5,864,738 A | 1/1999 | Kessler et al. | 395/200.69 |
| 5,867,649 A | 2/1999 | Larson | 395/200.31 |
| 5,870,313 A | 2/1999 | Boyle et al. | 364/491 |
| 5,870,619 A | 2/1999 | Wilkinson et al. | 395/800.2 |
| 5,875,117 A | 2/1999 | Jones et al. | 364/491 |
| 5,875,201 A | 2/1999 | Bauman et al. | 371/49.1 |
| 5,875,462 A | 2/1999 | Bauman et al. | 711/119 |
| 5,875,472 A | 2/1999 | Bauman et al. | 711/150 |
| 5,878,241 A | 3/1999 | Wilkinson et al. | 395/379 |
| 5,878,268 A | 3/1999 | Hagersten | 395/800.28 |
| 5,881,303 A | 3/1999 | Hagersten et al. | 395/800.3 |
| 5,887,138 A | 3/1999 | Hagersten et al. | 395/200.45 |
| 5,887,146 A | 3/1999 | Baxter et al. | 395/284 |
| 5,892,970 A | 4/1999 | Hagersten | 395/825 |
| 5,897,657 A | 4/1999 | Hagersten et al. | 711/145 |
| 5,900,020 A | 5/1999 | Safranek et al. | 711/167 |
| 5,903,461 A | 5/1999 | Rostoker et al. | 364/468.28 |
| 5,905,881 A | 5/1999 | Tran et al. | 395/395 |
| 5,905,998 A | 5/1999 | Ebrahim et al. | 711/144 |
| 5,911,052 A | 6/1999 | Singhal et al. | 395/293 |
| 5,914,887 A | 6/1999 | Scepanovic et al. | 364/491 |
| 5,922,063 A | 7/1999 | Olnowich et al. | 710/132 |
| 5,925,097 A | 7/1999 | Gopinath et al. | 709/200 |
| 5,931,927 A * | 8/1999 | Takashima | 710/65 |
| 5,931,938 A | 8/1999 | Drogichen et al. | 712/15 |
| 5,938,765 A | 8/1999 | Dove et al. | 713/1 |
| 5,941,967 A | 8/1999 | Zulian | 710/107 |
| 5,943,150 A | 8/1999 | Deri et al. | 359/133 |
| 5,946,710 A | 8/1999 | Bauman et al. | 711/129 |
| 5,950,226 A | 9/1999 | Hagersten et al. | 711/124 |
| 5,958,019 A | 9/1999 | Hagersten et al. | 709/400 |
| 5,960,455 A | 9/1999 | Bauman | 711/120 |
| 5,961,623 A | 10/1999 | James et al. | 710/113 |
| 5,963,745 A | 10/1999 | Collins et al. | 395/800.13 |
| 5,963,746 A | 10/1999 | Barker et al. | 395/800.2 |
| 5,963,975 A | 10/1999 | Boyle et al. | 711/147 |
| 5,964,886 A | 10/1999 | Slaughter et al. | 714/4 |
| 5,966,528 A | 10/1999 | Wilkinson et al. | 395/563 |
| 5,971,923 A | 10/1999 | Finger | 600/437 |
| 5,978,578 A | 11/1999 | Azarya et al. | 395/701 |
| 5,978,874 A | 11/1999 | Singhal et al. | 710/107 |
| 5,983,326 A | 11/1999 | Hagersten et al. | 711/147 |
| 5,999,734 A | 12/1999 | Willis et al. | 395/706 |
| 6,026,461 A | 2/2000 | Baxter et al. | 710/244 |
| 6,038,646 A | 3/2000 | Sproull | 711/158 |
| 6,038,651 A | 3/2000 | VanHuben et al. | 712/21 |
| 6,041,376 A | 3/2000 | Gilbert et al. | 710/108 |
| 6,049,845 A | 4/2000 | Bauman et al. | 710/113 |
| 6,049,853 A | 4/2000 | Kingsbury et al. | 711/147 |
| 6,052,760 A | 4/2000 | Bauman et al. | 711/119 |
| 6,055,617 A | 4/2000 | Kingsbury | 711/203 |
| 6,065,037 A | 5/2000 | Hitz et al. | 709/200 |
| 6,065,077 A | 5/2000 | Fu | 710/100 |
| 6,081,844 A | 6/2000 | Nowatzyk et al. | 709/233 |
| 6,085,295 A | 7/2000 | Ekanadham et al. | 711/145 |
| 6,092,136 A | 7/2000 | Luedtke | 710/107 |
| 6,092,156 A | 7/2000 | Schibinger et al. | 711/145 |
| 6,094,715 A | 7/2000 | Wilkinson et al. | 712/20 |
| 6,108,739 A | 8/2000 | James et al. | 710/113 |
| 6,119,215 A | 9/2000 | Key et al. | 712/19 |
| 6,141,733 A | 10/2000 | Arimilli et al. | 711/141 |
| 6,148,361 A | 11/2000 | Carpenter et al. | 710/260 |
| 6,155,725 A | 12/2000 | Scepanovic et al. | 395/500.1 |
| 6,161,191 A | 12/2000 | Slaughter et al. | 714/4 |
| 6,167,489 A | 12/2000 | Bauman et al. | 711/145 |
| 6,171,244 B1 | 1/2001 | Finger et al. | 600/437 |
| 6,173,386 B1 | 1/2001 | Key et al. | 712/10 |
| 6,173,413 B1 | 1/2001 | Slaughter et al. | 714/6 |
| 6,182,112 B1 | 1/2001 | Malek et al. | 709/201 |
| 6,189,078 B1 | 2/2001 | Bauman et al. | 711/156 |
| 6,189,111 B1 | 2/2001 | Alexander et al. | 714/8 |
| 6,199,135 B1 | 3/2001 | Maahs et al. | 710/129 |
| 6,199,144 B1 | 3/2001 | Arora et al. | 711/145 |
| 6,205,528 B1 | 3/2001 | Kingsbury et al. | 711/170 |
| 6,209,064 B1 | 3/2001 | Weber | 711/141 |
| 6,212,610 B1 | 4/2001 | Weber et al. | 711/164 |
| 6,226,714 B1 | 5/2001 | Safranek et al. | 711/119 |
| 6,542,947 B1 * | 4/2003 | Buhring | 710/107 |

\* cited by examiner

| example # (301) | bus input data (302) | # of ones on left part of input data (303) | # of ones on right part of input data (304) | total # of ones in input data (305) | decode control line value (306) | data sent from encoder (307) | # of ones sent from encoder (308) |
|---|---|---|---|---|---|---|---|
| 1 | FFFF 0000 | 16 | 0 | 16 | 1 | 0000 0000 | 0 |
| 2 | 0000 0000 | 0 | 0 | 0 | 0 | 0000 FFFF | 16 |
| 3 | FFFF FFFF | 16 | 16 | 32 | 0 | FFFF 0000 | 16 |
| 4 | 7FFF 0000 | 15 | 0 | 15 | 1 | 8000 0000 | 1 |
| 5 | 5555 5555 | 8 | 8 | 16 | 0 | 5555 AAAA | 16 |
| 6 | 000F 000E | 4 | 3 | 7 | 1 | FFF0 000E | 15 |
| 7 | 07CA 0444 | 7 | 3 | 10 | 1 | F835 0444 | 12 |
| 8 | 1324 8888 | 5 | 4 | 9 | 1 | ECDB 8888 | 15 |
| 9 | FF7E FF80 | 14 | 9 | 23 | 1 | 0081 FF80 | 11 |
| 10 | 0001 0003 | 1 | 2 | 3 | 0 | 0001 FFFC | 15 |
| 11 | FFFE FFFF | 15 | 16 | 31 | 0 | FFFE 0000 | 15 |

Table 300

METHOD AND APPARATUS FOR ENCODING A BUS TO MINIMIZE SIMULTANEOUS SWITCHING OUTPUTS EFFECT

FIELD OF THE INVENTION

Embodiments of the present invention relate to data busses. In particular, the present invention relates to a method and apparatus for minimizing the effects generated by simultaneous switching of outputs in a bus.

BACKGROUND

A bus is a collection of wires, interfaces, and control elements through which information is transmitted between components in a computer system. A bus may connect to components such as a processor, cache memory, or Random Access Memory (RAM) and may connect to subsystems or devices such as a disk drive, input device, or output device. The component transmitting information over a bus may be referred to as the "transmitting node" and the component receiving information at the output of the bus may be referred to as the "receiving node."

Data is typically transmitted over a bus in digital format with each wire or signal in the bus transmitting a single bit of information (i.e., binary value). During normal operation, each signal is either transmitting a voltage in a high range, which may represent the value of "one," or transmitting a voltage in a low range, which may represent the value of "zero." A signal may be said to be in a "high state" when it is driving a high voltage range and may be said to be in a "low state" when it is driving a low voltage range. A collection of signals in the bus may be referred to as a "databus." The individual states of the signals in a databus taken together define a set of states which the bus may be in. For example, when a bus is driving the value of FFFF it is one state, and when the bus is driving the value F0FF it is in another state.

During normal operation of the bus, signals are repeatedly switched between states as dictated by the content of the data being transferred. The state of the bus is sampled by a receiving node at time intervals, or cycles, which may be defined by a clock or strobe. Any signal in the bus may be changed from one cycle to the next, and it is not uncommon for the values being driven on each of the signals in the bus to switch states for consecutive cycles. For example, a large number of signals in a bus will change from one state to another from one cycle to the next (i.e., simultaneously) if a large number of the digital values being transmitted over the bus changes from one clock interval to the next. In a high speed bus the signals may be switched between states at a high rate, such as for example 1 million times per second.

A power supply or "rail" (which may be designated VCC) supplies the power to drive a signal from a low state to a high state. To go from a high state to a low state, the capacitance is drained from the signal to a ground. The switching of states of a large number of signals between cycles is known as simultaneous switching and causes a condition known as the simultaneous switching outputs ("SSO") effect. For example, when a large number of signals change from a high state to a low state during a clock cycle, this may cause the ground to rise in voltage. Because the ground has risen in voltage, it may take longer to drain the charge from the signals and, thus, longer to change the state of the signals. Similarly, when a large number of signals change from a low state to a high state during a clock cycle, this may cause the VCC to be lowered in voltage. In general, a large change in current relative to time (di/dt) produces supply offsets that may affect input buffers and adjacent drivers. A lower power supply voltage or higher ground voltage may slow outputs. A large di/dt can also cause errors on data strobes and may put noise on adjacent signals.

The SSO effect may be difficult to find, understand and correct and is particularly a problem in high speed busses or busses with a large width. The SSO effect can be minimized by distributing multiple grounds for each bus, for example two or three grounds for every bus pair. However, the use of multiple grounds and supply pins substantially increases the cost of the bus and the board area used.

DETAILED DESCRIPTION

Embodiments of the present invention relate to a method and apparatus for encoding a bus to minimize the impact of simultaneous switching effect by eliminating the cases where the entire bus draws current from VCC or drain to ground in a single cycle. In an embodiment, a databus is divided into right and left halves. Before data is driven down the bus for each cycle, the number of "ones" for each half the databus is counted and the half that has the most "ones" is inverted. In a further embodiment, a control bit is sent with the databus and indicates to the receiving agent which half of the databus is inverted. According to embodiments of this invention, one half of the databus will always be inverted. When embodiments such as these are used, the extreme cases are removed from the transition distribution (e.g., the bus is not will not transition from all "ones" to all "zeros" or vice versa). According to an embodiment, the maximum number of "ones" that can be driven is one-half the databus.

An embodiment of the invention includes an encoder that has a component to count the number of "ones" in each part of the databus and a component to compare the magnitudes of the counts. In a further embodiment, the result of the magnitude comparison determines which part of the databus is inverted and determines the value transmitted on the control signal. In a still further embodiment, a predictive method is used to avoid serializing the control bit with parity generation.

Figure 1:
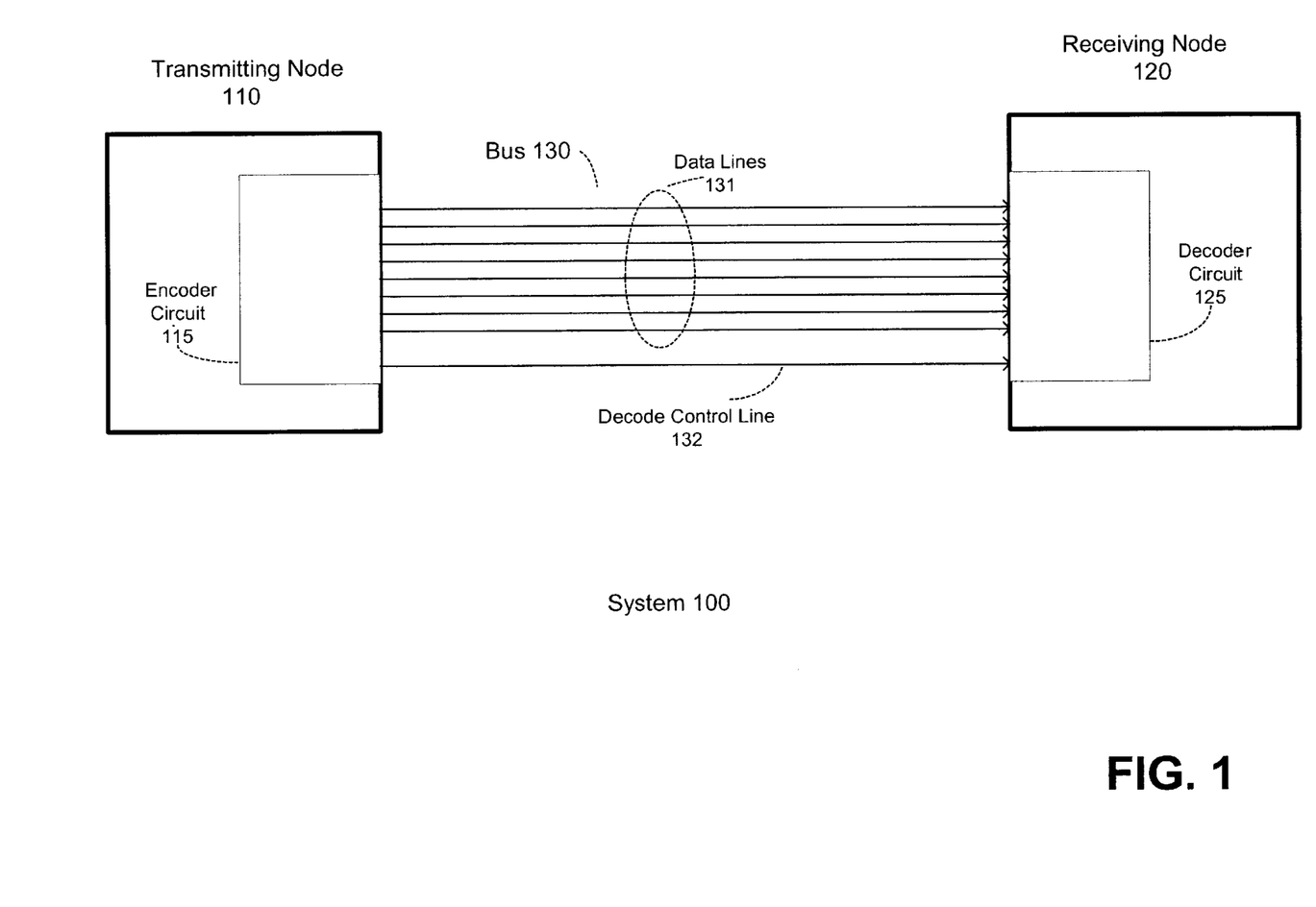
FIG. 1 is a partial block diagram of a system including an apparatus to encode a bus to minimize simultaneous switching according to an embodiment of the present invention.

FIG. 1 is a partial block diagram of a system 100 including an apparatus to encode a bus to minimize simultaneous switching according to an embodiment of the present invention. System 100 includes a transmitting node 110 which is coupled to a receiving node 120 through a bus 130. A node may be an architectural unit that includes a single component, such as a processor, memory device, or input/output device, or may include multiple components. Thus, each node in system 100 may be a single processor or may contain multiple processors as well as other resources such as memory devices. The term "coupled" encompasses a direct connection, an indirect connection, an indirect communication, etc.

Bus 130 may be a uni-directional bus or a bi-directional bus. For the purposes of illustration, bus 130 is shown as a uni-directional bus that transmits information from transmitting node 110 to receiving node 120. Bus 120 includes data lines 131 and a decode control line 132 which are coupled to transmitting node 110 and receiving node 120. In an embodiment, each of the lines in bus 130 is a signal that may transmit a single bit of binary information. The "data lines" 131 in bus 130 may include one or more strobe signals, parity lines, and control information. Data lines 131 may be referred to as a databus. Though not shown in FIG. 1, system 100 may also include a system clock which is coupled to the transmitting node 110 and receiving node 120. As shown in FIG. 1, bus 130 has eight data lines. In other embodiments, bus 130 may have any number of data lines, such as for example sixteen, twenty, etc.

As shown in FIG. 1, transmitting node 110 contains an encoder circuit 115 and receiving node 120 contains a decoder circuit 125. In an embodiment of the invention, decode control line 132 is a simultaneous switching decode control line, encoder circuit 115 is a simultaneous switching encoder circuit, and decoder circuit 125 is a simultaneous switching decoder circuit. In an embodiment, encoder circuit 115 may encode one-half of the bit values to be transmitted across data lines 131 in a cycle before driving the bit values over the databus so that maximum number of "ones" that can be driven is equal to or less than one-half the number of signals in the databus. In an embodiment, encoder circuit 115 contains components to determine the number of "one" values in each half of the databus and compare the results of this determination. In this embodiment, encoder circuit 115 may determine the number of "one" values in each half of the databus and compare the results of said determination. In an embodiment, encoder circuit 115 inverts the values sent on a part of the of data lines 131. In a further embodiment, encoder circuit 115 ensures that one-half the lines in the databus are inverted. In an embodiment, decoder circuit 125 decodes (i.e., re-inverts) the inverted values. In an embodiment, bus 130 is a bi-directional bus, receiving node 120 contains a encoder circuit and transmitting node 110 contains a decoder circuit. Details of "one" embodiment of an encoder circuit and a decoder circuit are discussed below with reference to FIG. 2.

Figure 2:
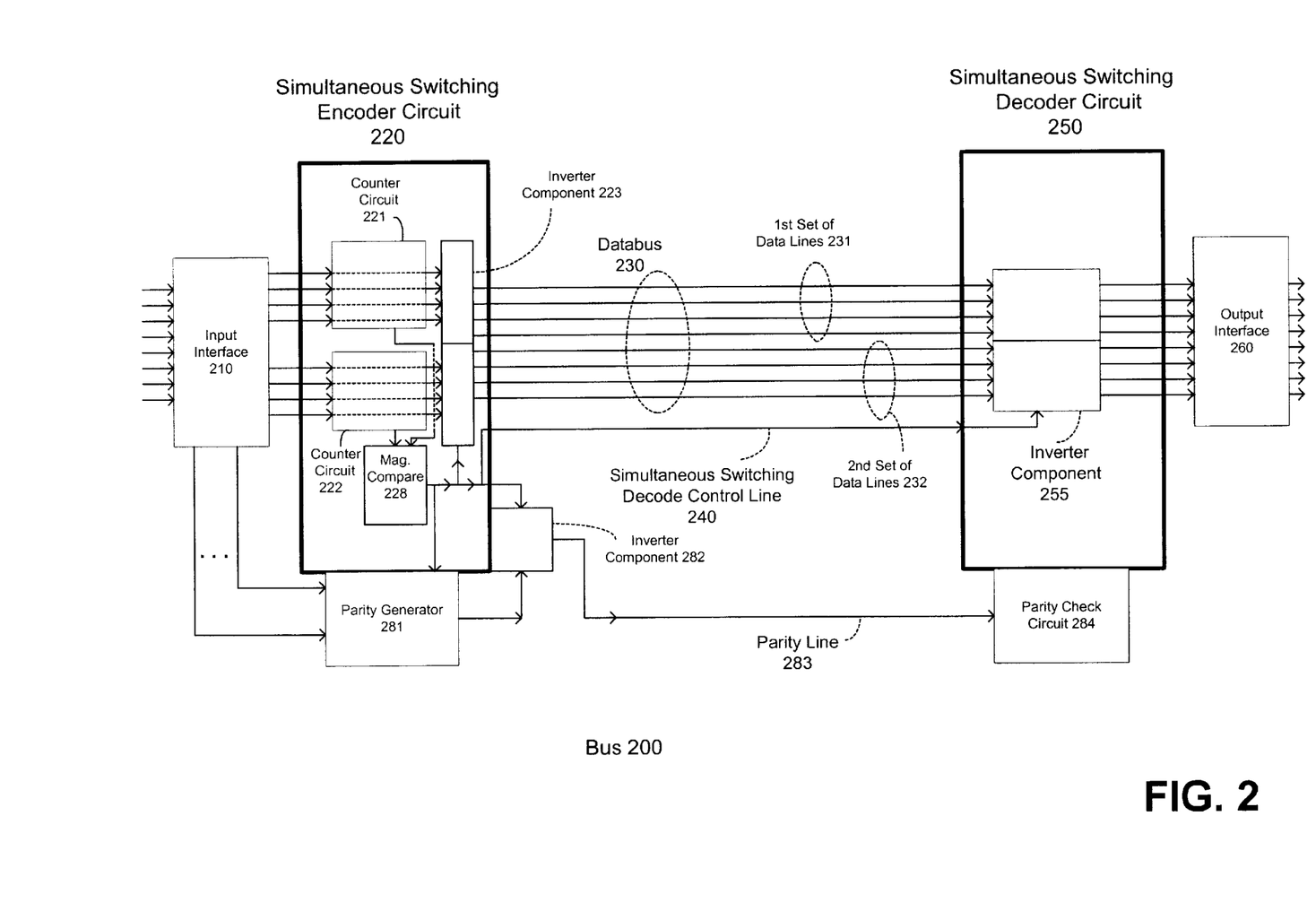
FIG. 2 is a partial block diagram of a bus according to an embodiment of the present invention.

FIG. 2 is a partial block diagram of a bus 200 according to an embodiment of the present invention. Bus 200 includes an input interface 210, simultaneous switching encoder circuit 220, databus 230, simultaneous switching decode control line 240, simultaneous switching decoder circuit 250, and output interface 260. Input interface 210 and output interface 260 may be used to connect bus 200 to components. Input interface 210 may include a plurality of inputs and output interface 260 may include a plurality of outputs. Input interface 210 may be coupled to simultaneous switching encoder circuit 220, and simultaneous switching decoder circuit 250 may be coupled to output interface 260. Databus 230 may be coupled to simultaneous switching encoder circuit 220 and simultaneous switching decoder circuit 250 and may transmit data values from simultaneous switching encoder circuit 220 to simultaneous switching decoder circuit 250.

In an embodiment, databus 230 is divided into parts. Databus 230 may include a first set of data lines 231 and a second set of data lines 232. In an embodiment, the first set of data lines 231 and second set of data lines 232 both have the same number of data lines. In FIG. 2, databus 230 comprises eight data lines, the first set of data lines 231 comprises four data lines, and second set of data lines 232 comprises four data lines. In other embodiments, databus 230, first set of data lines 231, and second set of data lines 232 may have any number of data lines, such as for example sixteen, twenty, sixty, etc.

Simultaneous switching encoder circuit 220 may include a counter circuit 221, a counter circuit 222, an inverter component 223, and a magnitude comparitor 228. In an embodiment, one half of the bits that are input to input interface 210 are coupled to counter circuit 221 as inputs, and the other half of the bits that are input to input interface 210 are coupled to counter circuit 222 as inputs. Counter circuit 221, counter circuit 222, and magnitude comparitor 228 may comprise a selector circuit that counts the number of signals in the first set of data lines and second set of data lines that have a certain value (e.g., a value of "one") and selects a set of data lines to be inverted based on the count determined. In an embodiment, counter circuit 221 and counter 223 are both Wallace trees which are structures of Carry Save Adders (CSAs) that count the number of "ones" values input into the counter and output a binary sum. In other embodiments, counter circuit 221 and counter 223 may count the number of "zeros." In an embodiment, magnitude comparitor 228 compares the magnitude of the sums generated by counter circuit 221 and counter circuit 222 and outputs a result that indicates which sum is greater. As shown in FIG. 2, the output of magnitude comparitor 228 is coupled to simultaneous switching decode control line 240 and is input to inverter component 223. In an embodiment, each of the bits that are input to input interface 210 are coupled to inverter component 223 as inputs.

As shown in FIG. 2, simultaneous switching decoder circuit 250 contains an inverter component 255 coupled to inputs of inverter 255. In this embodiment, simultaneous switching decode control line 240 is also coupled to an input of inverter component 255. The outputs of inverter component 255 are coupled to the outputs of output interface 260.

The operation of bus 200 according to an embodiment of the invention will now be described. A set of bit values may be received at input interface 210 during each cycle. Simultaneous switching encoder circuit 220 determines a value to be transmitted on the simultaneous switching decode control line 240 and encodes (i.e., inverts) a value to be transmitted on one set of data lines. In an embodiment, if the first half has more "ones" simultaneous switching encoder circuit 220 will select the first half of the input bits to be inverted and will send a value on simultaneous switching decode control line 240 indicating that the first half has been inverted. In this embodiment, if the second half has more "ones" simultaneous switching encoder circuit 220 will select the second half of the input bits to be inverted and will send a value on simultaneous switching decode control line 240 indicating that the second half has been inverted. In an embodiment, the first half of the inputs will be inverted if both halves have the same number of "ones." The inverted set of data lines and the non-inverted set of data lines are then transmitted during the bus cycle over databus 230 to simultaneous switching decoder circuit 250. In addition, the value determined for simultaneous switching decode control line 240 is transmitted over simultaneous switching decode control line 240 to simultaneous switching decoder circuit 250. Simultaneous switching decoder circuit 250 uses the value received on simultaneous switching decode control line 240 to determine which set of data lines needs to be re-inverted, re-inverts the values received on these data lines, and transmits the values for all of the data lines to output interface 260 as the bus output. Thus, the data lines that were inverted by simultaneous switching encoder circuit 220 are inverted back to their original state and output by simultaneous switching decoder circuit 250, and the data lines that were never inverted by simultaneous switching encoder circuit 220 are output by simultaneous switching decoder circuit 250 in their original state (i.e., they are not inverted by either simultaneous switching encoder circuit 220 or simultaneous switching decoder circuit 250). This process is repeated for the next group of inputs during the next bus cycle. In an embodiment, the selector circuit (e.g., counter circuit 221, counter circuit 222, and magnitude comparitor 228) and inverter component ensure that one-half the signals in databus 230 are inverted.

In a further embodiment, the simultaneous switching decode control line 240 is included in the parity generation. In this embodiment, the inputs at input interface 210 are coupled to inputs of a parity generator 281. The output of magnitude comparator 228 is coupled to an input of parity generator 281 and to an input of inverter component 282. Inverter component 282 may be an inverter coupled to a multiplexer. The output of parity generator 281 is also coupled to an input of inverter component 282. In this embodiment, an output of inverter component 282 is coupled to a parity line 283 which is coupled to an input of parity check circuit 284. In this embodiment, a predictive method must be used to avoid serializing simultaneous switching decode control line 240 and parity generation. An arbitrary but consistent assumption is made that the simultaneous switching decode control line 240 value will be "one." A value of "one" for simultaneous switching decode control line 240 is fed into the parity generation (not shown) while the actual simultaneous switching decode control line 240 value is computed in parallel. If the computed simultaneous switching decode control line 240 value is "zero," then the parity bit is inverted by inverter component 282. That is, the simultaneous switching encoder circuit will invert the value for the parity line based on the determination of the value transmitted on the simultaneous switching decode control line. If the computer simultaneous switching decode control line 240 value is really "one" (i.e., the prediction was correct), inverter component 282 does not invert the value generated by parity generator 281. Inverter component 282 transmits the parity bit value over parity line 283 to parity check circuit 284. According to this embodiment, simultaneous switching decode control line 240 generation should be completed by the time parity generation completes. This embodiment may be used where the two halves of the data bus have even numbers of signals. If the databus has an odd half and that side gets inverted by the decode control line 240, then parity does not get changed.

Figure 3:
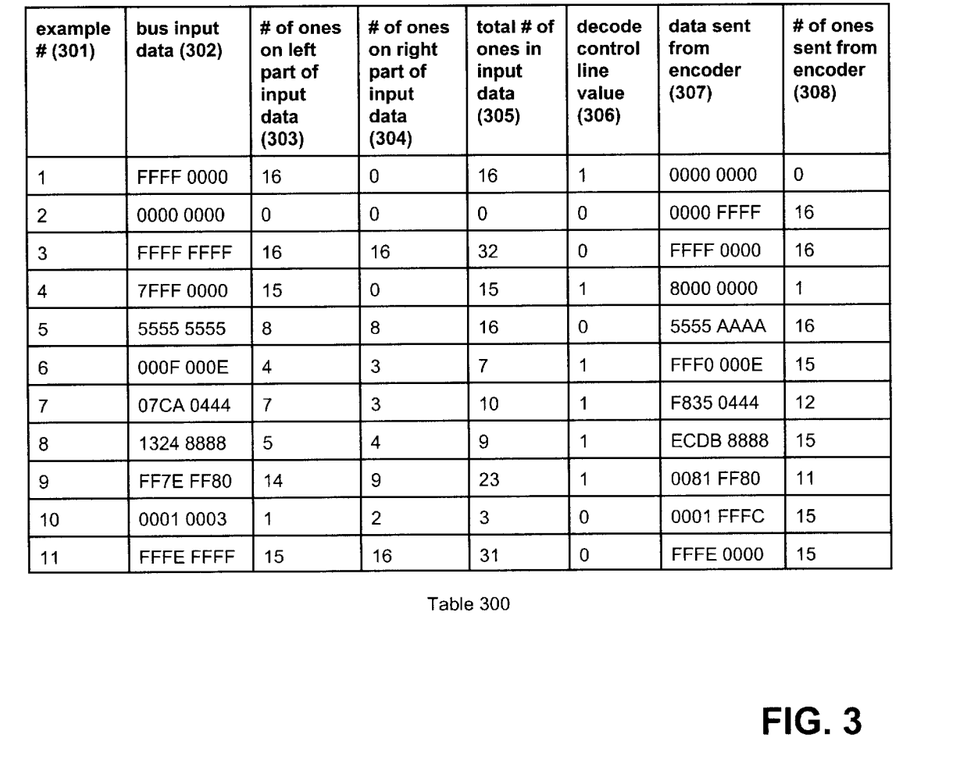
FIG. 3 is a table that contains sample bus states according to an embodiment of the present invention.

FIG. 3 is a table 300 that contains eleven examples of sample bus states according to an embodiment of the present invention. Table 300 includes an example number column 301, a bus input data column 302, a column that shows the number of "ones" on the left part of the input data 303, a column that shows the number of "ones" on right part of the input data 304, a column that shows the total number of "ones" in input data 305, a decode control line value column 306, a data sent from encoder column 307, and a column that shows the number of "ones" sent from the encoder 308. The examples in this table are for a thirty-two bit bus. The first example bus state will now be described. The example number 301 for this example is 1 to indicate that this is the first example. The bus input data 302 in this example is FFFF 0000. As would be appreciated by a person of skill in the art, the number of "ones" on the left part of the input data 303 is 16and the number of "ones" on right part of the input data 304 is 0. Thus, the total number of "ones" in input data 305 is 16. Because the left side has more "ones," in this embodiment the left side is inverted and the decode control line value 306 is "one" to indicate that the left side is inverted. With the left side inverted, the data sent from the encoder 307 is 0000 0000. Thus, the total number of "ones" transmitted from the encoder 308 in this example is 0. Of course, a person of skill in the art would understand examples two to eleven to operate similarly. A comparison of the examples (e.g., a comparison of example 1 with example 2, or a comparison of example 2 with example 3) shows that even when all of the values for the bus input data 302 may change from one state to another state in next cycle, the data sent from the encoder 307 across the databus will never change from all "ones" during one cycle to all "zeros" in the next cycle (or vise-versa). A person of skill in the art would appreciate that the bus illustrated by table 300 has $2^{32} \times 2$ possible states but, when encoded according to an embodiment of this invention, the bus only uses one-half of the states. Thus, the encoder circuit has eliminated certain state changes and, therefore, minimized the impact of simultaneous switching.

Figure 4:
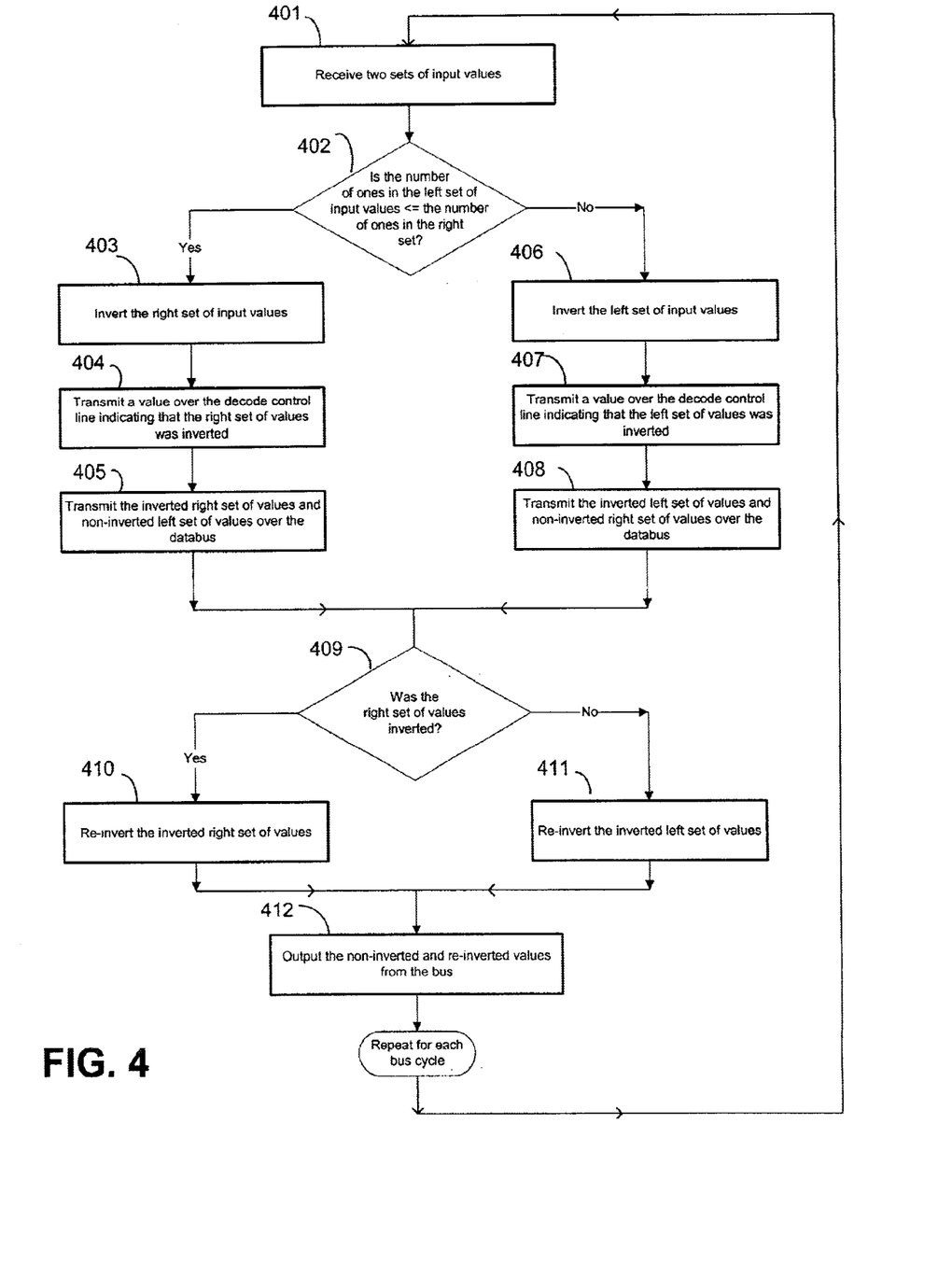
FIG. 4 is a flow diagram of a method of encoding a bus to minimize simultaneous switching according to an embodiment of the present invention.

FIG. 4 is a flow diagram of a method of encoding a bus to minimize simultaneous switching according to an embodiment of the present invention. This method may be used with the apparatus described above. A multi-bit value is received that is to be sent over a bus, and this value comprises two sets of input values (401). The first set of input values may be viewed as the values for the right side of a bus (the "right set"), and the second set of input values may be viewed as the values for the left side of the bus (the "left set"). According to this embodiment, the number of bits in each set that has a value of "one" is counted and compared (402). If the number of "ones" in the left set of input values is equal to or less than the number of "ones" in the right set, then the right set of input values is inverted (403), a value is transmitted over the decode control line indicating that the right set of values was inverted (404), and the inverted right set of values and non-inverted left set of values are transmitted over the databus (405). If the number of "ones" in the left set of input values is greater than the number of "ones" in the right set, then the left set of input values is inverted (406), a value is transmitted over the decode control line indicating that the left set of values was inverted (407), and the inverted left set of values and non-inverted right set of values are transmitted over the databus (408).

The receiving agent receives both sets of data values and receives the decode control line value. The decode control line value is examined to determine which set of data values was inverted (409). If the right set of data values was inverted, then the right set of values are re-inverted (410). If the left set of data values was inverted, then the left set of values are re-inverted (411). The un-inverted and re-inverted data values are then output from the bus (412). This process is repeated for each bus cycle.

The invention disclosed in this application provides a method and apparatus for encoding a bus to minimize the effect of simultaneous switching. The SSO effect is known to cause large di/dt resulting in noise and local supply and ground degradation. The invention disclosed in this application may be employed to manage the input/output (I/O) design and performance by eliminating extreme conditions for the I/O and system designer.

The apparatus and method according to the present invention have been described with respect to several exemplary embodiments. It can be understood, however, that there are many other variations of the above described embodiments which will be apparent to those skilled in the art. It is understood that these modifications are within the teaching of the present invention, which is to be limited only by the claims appended hereto. For example, the number of "zeros" may be counted instead of the number of "ones." As another example, the method disclosed with reference to FIG. 4 may be performed in a different order.

We claim:

1. A bus comprising:
a plurality of data lines having a first set of data lines and a second set of data lines;
a selector circuit to provide a first count of the number of data lines in the first set of data lines that have a certain value and a second count of the number of data lines in the second set of data lines that have that certain value, and to select one set of data lines to be inverted based on the first count and second count; and
an inverter to invert the set of data lines selected.

2. The bus of claim 1, wherein the selector circuit comprises a Wallace tree and a magnitude comparator component.

3. The bus of claim 1, wherein the bus has n data lines and $2^n \times 2$ states, and wherein the selector circuit and inverter eliminate certain state changes.

4. The bus of claim 1, wherein the bus has n data lines and the bus has $2^n \times 2$ states, and wherein the bus only uses one-half of the states.

5. The bus of claim 1, wherein the selector circuit and inverter are to ensure that one-half the signals in the bus are inverted.

6. A bus comprising a plurality of data lines and a simultaneous switching decode control line, wherein at least two of the plurality of data lines are coupled to a simultaneous switching encoder circuit and to a simultaneous switching decoder circuit, wherein the simultaneous switching encoder circuit comprises a circuit to count data lines having a certain value and to select data lines to be inverted based on the count.

7. The bus of claim 6, wherein the simultaneous switching encoder circuit further comprises a component to encode a value to be transmitted on at least one of the plurality of data lines.

8. The bus of claim 7, wherein the simultaneous switching decoder circuit comprises a selector to select the at least one of the plurality of data lines based on the value received on the simultaneous switching decode control line and an inverter to invert a value received on the at least one of the plurality of data lines.

9. The bus of claim 6, wherein the bus further comprises a parity line coupled to a first inverter to invert the value transmitted on the parity line, and wherein the simultaneous switching encoder circuit comprises a second inverter to invert the value for the parity line based on the determination of the value transmitted on the simultaneous switching decode control line.

10. A bus having an input interface and an output interface, the bus comprising:
an encoder circuit having a plurality of inputs coupled to the bus input interface and a plurality of outputs, the encoder circuit including a pair of counting components and a magnitude comparator;
a decoder circuit having a plurality of outputs coupled to the bus output interface and a plurality of inputs;
a databus coupled to an output of the encoder circuit and to the input of the decoder circuit; and
a decode control line coupled to an output of the encoder circuit and to an input of the decoder circuit.

11. The bus of claim 10, wherein the databus comprises a first set of data lines and a second set of data lines, wherein the input interface has a first set of inputs and a second set of inputs, and wherein the pair of counting components comprises:
a first counter circuit having a plurality of inputs coupled to the first set of inputs in the input interface; and
a second counter circuit having a plurality of inputs coupled to the second set of inputs in the input interface.

12. The bus of claim 11, wherein the encoder circuit further comprises an inverter component coupled to first set of data lines and second set of data lines, and wherein the magnitude comparator comprises:
inputs coupled to an output of the first counter circuit and to an output of the second counter circuit;
an output coupled to an input of the inverter component; and
an output coupled to the decode control line.

13. The bus of claim 10, wherein the decoder circuit comprises an inverter component that comprises inputs coupled to the databus, an input coupled to the decode control line, and outputs coupled to the output interface.

14. The bus of claim 10, wherein the bus comprises a parity line, and wherein the bus further comprises:
a parity generator comprising inputs coupled to the bus input interface; and
an inverter component comprising an input coupled to an output of the parity generator, an input coupled to an output of the encoder circuit, and an output coupled to the parity line.

15. A system comprising:
a plurality of data lines to transmit data values;
a first node comprising an encoder circuit coupled to an end of the plurality of data lines to invert the values sent on a part of the plurality of data lines, wherein the encoder circuit comprises a Wallace tree to determine which data values are to be inverted by the encoder;
a second node including a decoder circuit coupled to another end of the plurality of data lines to re-invert the values that were inverted by the encoder circuit; and
a control line coupled to the encoder circuit and the decoder circuit to control which data values are re-inverted by the decoder circuit.

16. The system of claim 15, wherein the part of the plurality of data lines for which the values sent are inverted comprises one half of the data lines in the plurality of data lines.

17. The system of claim 15, wherein the first node comprises a processor.

18. The system of claim 17, wherein the second node comprises an input device or an output device.

19. A method of sending data over a data bus, the method comprising:
determining that a first set of bus input values should be inverted, wherein determining that the first set of input values should be inverted comprises counting the number of input values in the first set having a certain value and determining if that count is less than or the same as the number of input values in the second set having that certain value;
inverting the first set of bus input values and transmitting the inverted first set of input values over a first set of signals;

transmitting a second set of bus input values over a second set of signals;

receiving the second set of values and the inverted first set of values from the signals; and un-inverting the received inverted first set of values.

20. The method of claim 19, wherein the method further comprises transmitting a value over a control line, the value transmitted indicating that the first set of input values has been inverted.

21. The method of claim 20, wherein the method further comprises:

determining a parity bit value, wherein the determination assumes that the first set of values are to be inverted; and determining whether the parity bit value should be re-inverted before it is transmitted over the data bus based on the determination to invert the first set of input values.

22. The method of claim 20, wherein the first set of input values comprise one-half of the input values.

23. A system comprising:

a bus input interface to receive a plurality of input values;

a databus having a plurality of signals;

a means for encoding one-half of the input values before driving the values over the databus so that maximum number of ones that can be driven is equal to or less than one-half the number of signals in the databus, wherein the means for encoding comprises a means for determining the number of one values in each half of the databus and a means for comparing the results of said determination.

24. The system of claim 23, wherein the means for encoding comprises a means for ensuring that one-half the signals in the databus are inverted.

25. The system of claim 23, wherein the system further comprises a means for decoding the inverted values.

\* \* \* \* \*

UNITED STATES PATENT AND TRADEMARK OFFICE
CERTIFICATE OF CORRECTION

PATENT NO.    : 6,721,918 B2
DATED         : April 13, 2004
INVENTOR(S)   : Self et al.

It is certified that error appears in the above-identified patent and that said Letters Patent is hereby corrected as shown below:

<u>Column 8, lines 56-67 through Column 9, lines 1-5,</u>
Delete entire text and replace with:
19.    A method of sending data over a data bus, the method comprising:
       determining that a first set of bus input values should be inverted, wherein determining that the first set of input values should be inverted comprises counting the number of input values in the first set having a certain value and determining if that count is less than or the same as the number of input values in the second set having that certain value;
       inverting the first set of bus input values and transmitting the inverted first set of input values over a first set of signals;
       transmitting a second set of bus input values over a second set of signals;
       receiving the second set of values and the inverted first set of values from the signals; and
       un-inverting the received inverted first set of values.

<u>Column 9,</u>
Line 13, change "are" to -- is --.
Line 20, change "comprise" to -- comprises --

Signed and Sealed this

Fourth Day of January, 2005

JON W. DUDAS
*Director of the United States Patent and Trademark Office*